US009641546B1

(12) United States Patent
Manni et al.

(10) Patent No.: US 9,641,546 B1
(45) Date of Patent: *May 2, 2017

(54) ELECTRONIC DEVICE FOR AGGREGATION, CORRELATION AND CONSOLIDATION OF ANALYSIS ATTRIBUTES

(71) Applicant: FireEye, Inc., Milpitas, CA (US)

(72) Inventors: Jayaraman Manni, San Jose, CA (US); Philip Eun, San Jose, CA (US); Michael M. Berrow, Concord, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,088

(22) Filed: Apr. 11, 2016

Related U.S. Application Data

(63) Continuation of application No. 13/828,785, filed on Mar. 14, 2013, now Pat. No. 9,311,479.

(51) Int. Cl.
    *H04L 29/06* (2006.01)
(52) U.S. Cl.
    CPC ................... *H04L 63/1425* (2013.01)
(58) Field of Classification Search
    None
    See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Network Security: NetDetector—Network Intrusion Forensic System (NIFS) Whitepaper", ("NetDetector Whitepaper"), (2003).

(Continued)

*Primary Examiner* — Amir Mehrmanesh
(74) *Attorney, Agent, or Firm* — Rutan & Tucker, LLP

(57) ABSTRACT

In communication with security appliances, an electronic device for providing a holistic view of a malware attack is described. The electronic device features one or more processors and a storage device. The storage device includes aggregation logic, correlation logic, consolidation logic, and display logic: The aggregation logic is configured to receive input attributes and analysis attributes from each of the security appliances. The correlation logic attempts to find relationships between analysis attributes provided from each security appliance. The consolidation logic receives at least (i) a first analysis attribute from a first security appliance and (ii) a second analysis attribute from a second security appliance in response to the first analysis attribute corresponding to the second analysis attribute. The display logic generates display information including the consolidated input attributes.

18 Claims, 14 Drawing Sheets

(56) References Cited

U.S. PATENT DOCUMENTS

| | | |
|---|---|---|
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |

(56) References Cited

U.S. PATENT DOCUMENTS

| | | |
|---|---|---|
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1* | 12/2004 | Wiederin .............. G06F 21/567 726/12 |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |

(56) References Cited

U.S. PATENT DOCUMENTS

| | | |
|---|---|---|
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0089165 A1* | 4/2007 | Wei .................. H04L 12/585 726/4 |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |

(56) References Cited

U.S. PATENT DOCUMENTS

| | | |
|---|---|---|
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333032 A1* | 12/2013 | Delatorre ............ H04L 63/1441 726/23 |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 02/06928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Adobe Systems Incorporated, "PDF 32000-1:2008, Document management—Portable document format—Part1:PDF 1.7", First Edition, Jul. 1, 2008, 756 pages.

AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).

AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://

(56) References Cited

OTHER PUBLICATIONS seclists.org/honeypots/2003/q2/319 ("Boubalos"), (Jun. 5, 2003).
Cahaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., "Zlib compressed data format specification version 3.3" RFC 1950, (1996).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Menke Kaeo, Designing Network Security ("Kaeo"), (2005).
Filiol, Eric, et al., "Combinatorial Optimisation of Worm Propagation on an Unknown Network", International Journal Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, p. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hjelmvik, Erik, "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http/ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. ,"Random House Webster's 'Computer & Internet Dictionary 3rd Edition'", ISBN 0375703519, (Dec. 1998).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.

(56) References Cited

OTHER PUBLICATIONS

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford. edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 13/828,785, filed Mar. 14, 2013 Non-Final Office Action dated Mar. 25, 2015.

U.S. Pat. No. 8,171,553, filed Apr. 20, 2006, Inter Parties Review Decision dated Jul. 10, 2015.

U.S. Pat. No. 8,291,499, filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

ELECTRONIC DEVICE FOR AGGREGATION, CORRELATION AND CONSOLIDATION OF ANALYSIS ATTRIBUTES

RELATED APPLICATIONS

This application is a continuation of U.S. patent application Ser. No. 13/828,785 filed on Mar. 14, 2013, now U.S. Pat. No. 9,311,479 issued Apr. 12, 2016, the entire contents of which are incorporated by reference herein.

FIELD OF THE INVENTION

Embodiments of the disclosure relate to the field of network security. More specifically, one embodiment of the disclosure relates to a system, apparatus and method for correlating analytic data produced by different malware content detection systems, and consolidating portions of this data to provide a holistic view of a malware attack.

BACKGROUND

Over the last decade, malicious software (malware) has become a pervasive problem for Internet users. In some situations, malware is a program or file that is embedded within downloadable content and designed to adversely influence (i.e. attack) normal operations of a computer. Examples of different types of malware may include bots, computer viruses, worms, Trojan horses, spyware, adware, or any other programming that operates within the computer without permission.

For instance, content may be embedded with objects associated with a web page hosted by a malicious web site. By downloading this content, malware causing another web page to be requested from a malicious web site may be unknowingly installed on the computer. Similarly, malware may also be installed on a computer upon receipt or opening of an electronic mail (email) message. For example, an email message may contain an attachment, such as a Portable Document Format (PDF) document, with embedded executable malware. Also, malware may exist in files infected through any of a variety of attack vectors, which are uploaded from the infected computer onto a networked storage device such as a file share.

Over the past few years, various types of security appliances have been deployed at different segments of a network. These security appliances are configured to uncover the presence of malware embedded within ingress content propagating through over these different segments. However, there is no mechanism that operates, in concert with multiple security appliances, to correlate and consolidate information from these security appliances in order to provide a customer with a holistic view of a malware attack.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
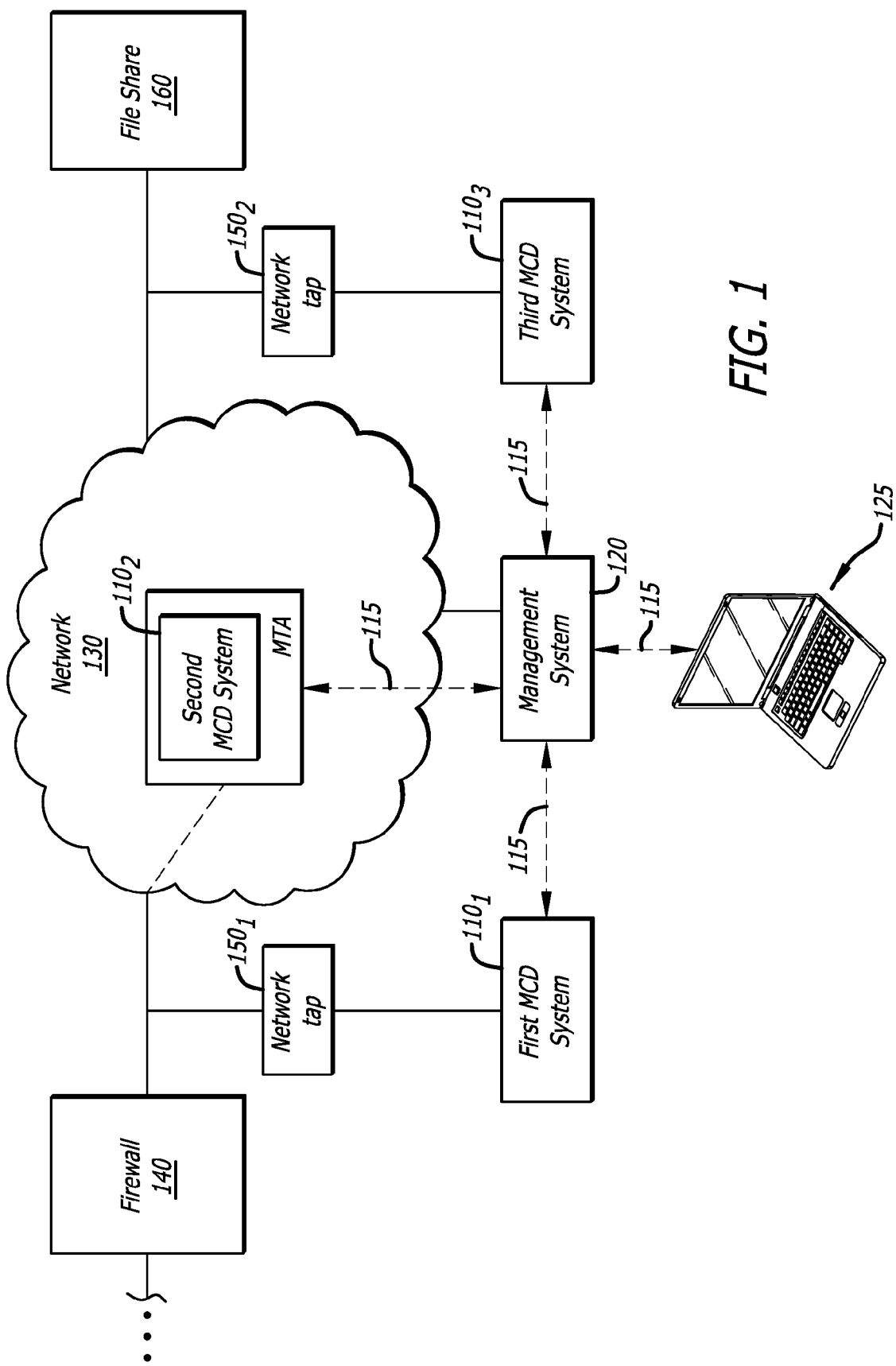
FIG. 1 is an exemplary block diagram of a communication network deploying a plurality of malware content detection (MCD) systems.

Various embodiments of the disclosure relate to a management system configured to correlate analytic data received from multiple malware content detection (MCD) systems. In general, the management system controls the uploading of analytic data from each MCD system. This analytic data enables the management system to (i) determine whether the same malware appears to be present at different MCD systems (i.e. evidence of a malware attack) and (ii) consolidate at least a portion of the analytic data in order to provide a holistic view of the malware attack. This "holistic view" may be accomplished by generating one or more screen displays that provide comprehensive details concerning the network entry point and migration of suspicious network content.

More specifically, the management system is configured to receive, from each of the MCD systems, analytic data associated with suspicious network content that has been analyzed by that MCD system for malware. The analytic data comprises (1) information that identifies the suspicious network content (e.g., a time-stamp value, monotonic count value, or another type of identifier); (2) input attributes; and (3) analysis attributes. In general, "input attributes" include information used in the routing of the content, such as source and/or destination information. "Analysis attributes" include information directed to portions of the suspicious network content that are analyzed for malware (hereinafter referred to as "artifacts") as well as one or more anomalous behaviors observed during malware detection analysis of the artifacts.

After receipt of analytic data from different MCD systems, the management system correlates the analytic data by recursively comparing analysis attributes recovered from one MCD system with analysis attributes recovered from one or more other MCD systems. Upon determining that at least certain analysis attributes from different MCD systems match, the input attributes corresponding to these compared analysis attributes may be consolidated to provide greater details as to the infection vector for the suspicious network content (e.g. initial source, number of recipients, time of receipt, etc.).

I. Terminology

In the following description, certain terminology is used to describe features of the invention. For example, in certain situations, the terms "logic" and "engine" are representative of hardware, firmware or software that is configured to perform one or more functions. As hardware, logic may include circuitry such as processing circuitry (e.g., a microprocessor, one or more processor cores, a programmable gate array, a microcontroller, an application specific integrated circuit, etc.), wireless receiver, transmitter and/or transceiver circuitry, semiconductor memory, combinatorial logic, or other types of electronic components.

As software, logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but is not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "network content" generally refers to information transmitted over a network as one or more messages, namely a grouping of information that comprises a header and a payload, such as any of the following: a packet; a frame; a stream being a sequence of packets or frames; an Asynchronous Transfer Mode "ATM" cell; or any other series of bits having a prescribed format. The "payload" is generally defined as including the data associated with the message such as text, software, an image, an object, audio, video, a Uniform Resource Locator (URL), or other types of digital data. The "header" is generally defined as including control information. However, the specific types of control information depend on the network content type.

For data traffic, such as data transmitted in accordance with a Hypertext Transfer Protocol (HTTP), HyperText Markup Language (HTML) protocol, the header may include source and destination Internet Protocol (IP) addresses (e.g., IPv4 or IPv6 addressing) and/or source and destination port information.

Another examples of network content includes email, which may be transmitted using an email protocol such as Simple Mail Transfer Protocol (SMTP), Post Office Protocol version 3 (POP3), or Internet Message Access Protocol (IMAP4). A further example of network content includes an Instant Message, which may be transmitted using Session Initiation Protocol (SIP) or Extensible Messaging and Presence Protocol (XMPP) for example. Yet another example of network content includes one or more files that are transferred using a data transfer protocol such as File Transfer Protocol (FTP) for subsequent storage on a file share. Where the network content is email, Instant Message or a file, the header may include the sender/recipient address, the sender/recipient phone number, or a targeted network location of the file, respectively.

The term "malware" is directed to software that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of an electronic device executing that application software in a malicious manner; (2) alters the functionality of an electronic device executing that application software without any malicious intent; and/or (3) provides an unwanted functionality which is generally acceptable in other context.

The term "transmission medium" is a communication path between two or more systems (e.g. any electronic devices with data processing functionality such as, for example, a security appliance, server, mainframe, computer, netbook, tablet, smart phone, router, switch, bridge or brouter). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of a communication network 100 deploying a plurality of malware content detection (MCD) systems $110_1$-$110_N$ (N>1) communicatively coupled to a management system 120 via a network 130 is shown. In general, management system 120 is adapted to manage MCD systems $110_1$-$110_N$. For instance, management system 120 may be adapted to cause malware signatures generated by any of MCD systems $110_1$-$110_N$ to be shared with one or more of the other MCD systems $110_1$-$110_N$, for example, on a subscription basis. Furthermore, management system 120 may be adapted to aggregate, correlate and consolidate analytic data provided by MCD systems $110_1$-$110_N$ for subsequent conveyance to an electronic device 125 with display capabilities, as represented by communication paths 115. This analytic data, when correlated and consolidated, provides a network administrator with more information for defending against and preventing a malware attack.

Each MCD system $110_1$-$110_N$ (N=3) is adapted to intercept and analyze network content (e.g., data traffic, email, files, etc.) in real-time so as to determine whether the network content constitutes suspicious network content. The network content is considered to be "suspicious" when a portion of the network content (e.g. payload data) is determined, with a certain level of likelihood, to include malware.

According to this embodiment of the communication network, a first MCD system $110_1$ may be a web-based security appliance that is configured to inspect ingress data traffic, identify whether any artifacts of the data traffic may include malware, and if so, analyze at least those artifacts. This analysis may be partially conducted in a virtual machine (VM) execution environment to detect anomalous behaviors that would be present if the data traffic was actually processed by an electronic device. The particulars of this analysis are described below.

As shown in FIG. 1, first MCD system $110_1$ may be deployed as an inline security appliance (not shown) or coupled to network 130 via a network tap $150_1$ (e.g., a data/packet capturing device), which can be integrated into first MCD system $110_1$, provided as a standalone component, or integrated into different network components such as a firewall 140, a router, a switch or other type of network relay device. Network tap $150_1$ may include a digital network tap configured to monitor network content (data traffic) and provide a copy of the data traffic along with its metadata to first MCD system $110_1$ for analysis. The data traffic may comprise signaling transmitted over network 130, including data from/to a remote server 160.

As further shown in FIG. 1, second MCD system $110_2$ is a communication-based security appliance that is configured to analyze and report suspicious network content, such as malware within an incoming communication message (e.g., email message, short message service "SMS" message, etc.). As shown, second MCD system $110_2$ may be positioned within a message transfer agent (MTA) deployed in network 130 as shown, or connected to network 130 via a network tap.

Third MCD system $110_3$ is a storage-based security appliance that is configured to analyze and report suspicious network content, such as potential malware within a file to be uploaded into one or more file shares 160. As with first MCD system $110_1$, third MCD system $110_3$ may be deployed as an inline security appliance (not shown) or coupled to network 130 via a network tap $150_2$.

It is contemplated that management system 120 may be deployed to provide cloud computing services for correlation and consolidation of the analytic data as described. Furthermore, it is contemplated that the functionality of one or more MCD systems $110_1$-$110_N$ may be incorporated into management system 120 when malware detection is to be conducted at a centralized resource.

Figure 2:
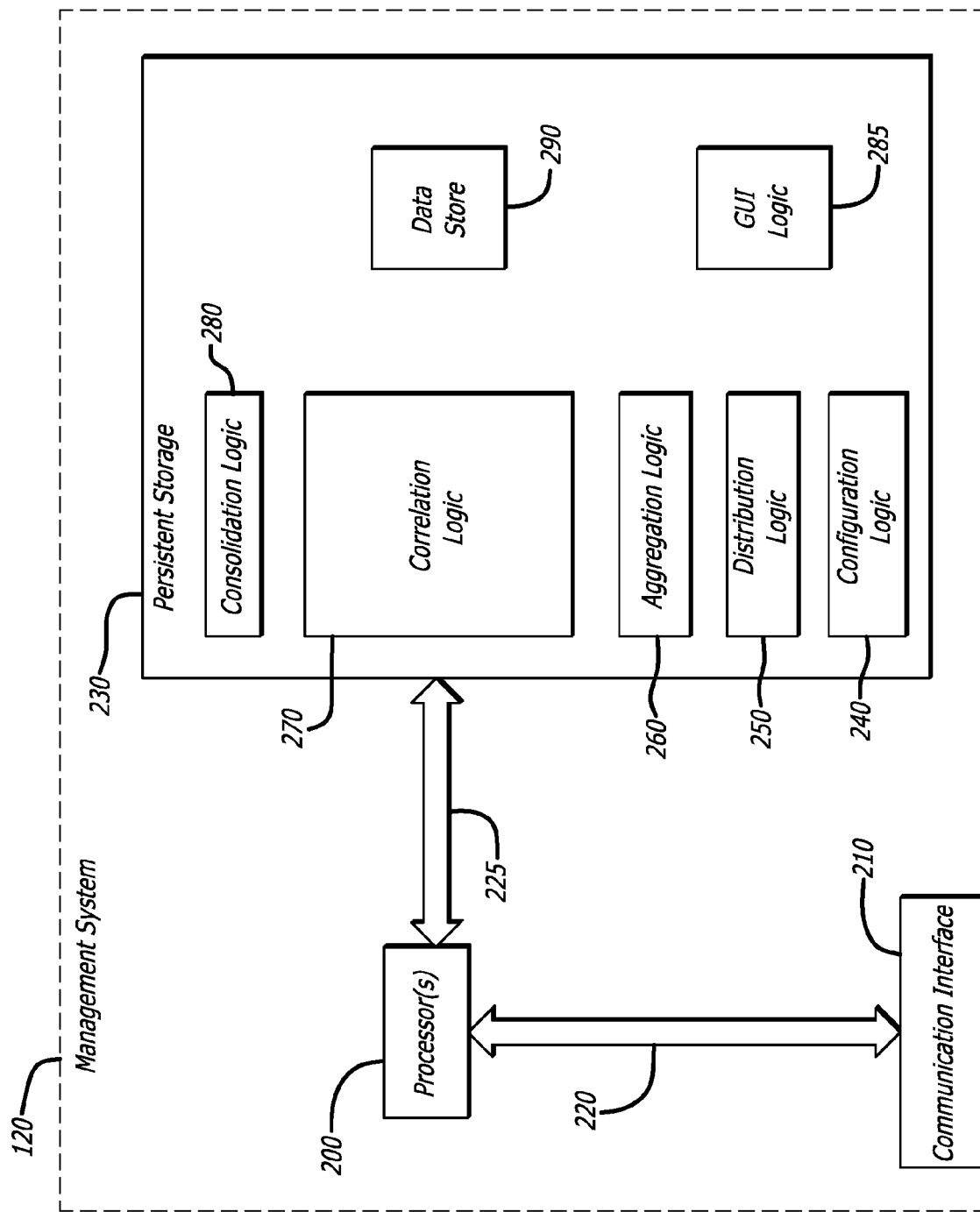
FIG. 2 is an exemplary block diagram of logic implemented within the management system of FIG. 1.

Referring now to FIG. 2, an exemplary block diagram of logic that is implemented within management system 120 is shown. Management system 110 comprises one or more processors 200 that are coupled to communication interface logic 210 via a first transmission medium 220. Communication interface 210 enables communications with MCD systems $110_1$-$110_N$ of FIG. 1 as well as other electronic devices over private and/or public networks, such as electronic device 125 used to view the correlated and consolidated analytic results from the malware detection analysis. According to one embodiment of the disclosure, communication interface logic 210 may be implemented as a physical interface including one or more ports for wired connectors. Additionally, or in the alternative, communication interface logic 210 may be implemented with one or more radio units for supporting wireless communications with other electronic devices.

Processor 200 is further coupled to persistent storage 230 via transmission medium 225. According to one embodiment of the disclosure, persistent storage 230 may include configuration logic 240, distribution logic 250, aggregation logic 260, correlation logic 270 and/or consolidation logic 280. Of course, when implemented as hardware, logic 240, 250, 260, 270 and/or 280 would be implemented separately from persistent memory 230.

Configuration logic 240 provides centralized control of the functionality of MCD systems $110_1$-$110_N$. In particular, configuration logic 240 allows an administrator in a customer environment to alter configuration information within MCD systems $110_1$-$110_N$ as well as other networked electronic devices. For instance, as illustrative examples, configuration logic 240 may be used to alter the Internet Protocol (IP) address assigned to one of the security appliances (e.g., MCD system $110_1$), alter key information stored within any of MCD systems $110_1$-$110_N$, alter user access/privileges so that different administrators have different access rights, or the like.

Distribution logic 250 allows management system 120 to influence analysis priorities at one MCD system based on suspicious network content detected at another MCD system. For instance, during analysis of the network content, a second MCD system $110_2$ may receive an email message for malware detection analysis, where the email message includes an artifact (e.g., URL) within its payload. As second MCD system $110_2$ is not configured to analyze the URL before access by the end-user, the URL is merely provided to management system 120 as an analysis attribute.

The presence of certain artifacts (e.g., URL) as an analysis attribute within the stored analytic data may prompt distribution logic 250 to transmit a priority message to first MCD system $110_1$ of FIG. 1. The priority message requests malware detection analysis to be conducted on any network content associated with the URL, where the URL is selected by the end user. Of course, it is contemplated that management system 120 may be adapted to ignore or lessen the analysis priority of network content, especially where the network content is determined to be provided from a trusted source.

Aggregation logic 260 is configured to request (i.e. pull) analytic data from each of the MCD systems $110_1$-$110_N$ for storage within an internal data store 290, where at least a portion of the analytic data is used by correlation logic 270. In particular, according to one embodiment of the disclosure, aggregation logic 260 maintains network addresses (e.g., Internet Protocol "IP" address and/or media access control "MAC" address) for each MCD system $110_1$-$110_N$. In response to a triggering event, where the event may be scheduled based on an elapsed time or may be aperiodic, aggregation logic 260 sends a message to one or more MCD systems $110_1$-$110_N$ requesting analytic data (hereinafter generally referred to as an "Analytic Data Query message"). Within each Analytic Data Query message, aggregation logic 260 may provide information (e.g. last stored time-stamp value and/or sequence value, etc.) to assist a targeted MCD system (e.g., MCD system $110_i$, where 1≤i≤N) to identify stored analytic data that has not yet been uploaded to management system 120.

Figure 3:
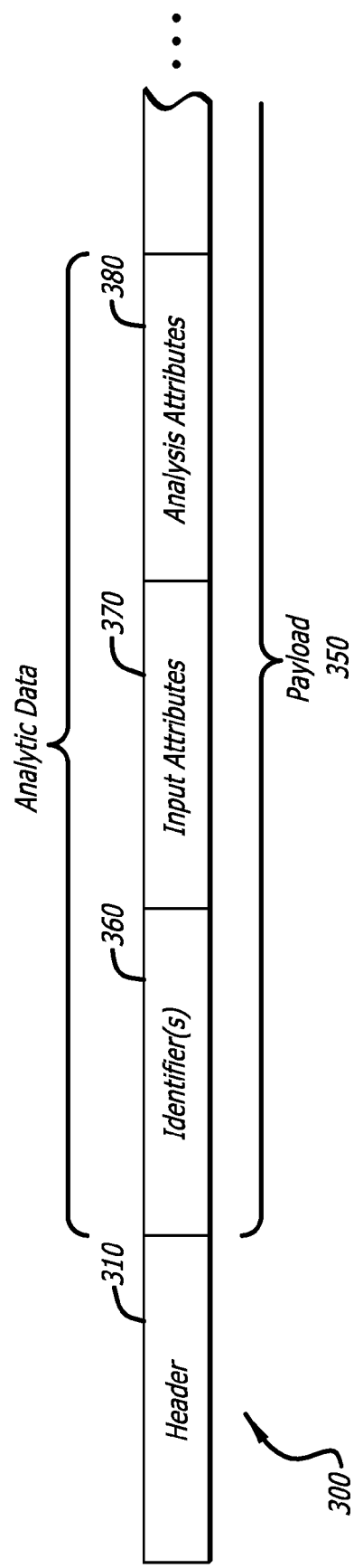
FIG. 3 is an exemplary block diagram of an Analytic Data Response message received by the management system from a MCD system.

In response to an Analytic Data Query message, management system 120 receives one or more Analytic Data Response messages 300 from targeted MCD system $110_i$ as shown in FIG. 3. Analytic Data Response message 300 comprises (1) a header 310 and (2) a payload 350. Header 310 includes at least a source address 320 identifying MCD system $110_i$. Payload 350 comprises information associated with suspicious network content analyzed by the targeted MCD system. The information includes at least (i) an identifier for the suspicious network content (e.g., assigned sequence number and/or time-stamp value, etc.), (ii) one or more input attributes associated with the suspicious network content, and/or (iii) one or more analysis attributes associated with the suspicious network content.

It is contemplated that multiple messages may be utilized to provide the information to management system 120, such as the analysis attributes being provided in a first message and input attributes provided in a subsequent message. Also, it is contemplated that MCD system $110_i$ may be adapted to "push" the input attributes and/or analysis attributes in lieu of the "pull" operations as described.

Where different MCD systems are operating on common suspicious network content, these MCD systems $110_1$-$110_N$ of FIG. 1 will provide one or more identical analysis attributes. These analysis attributes are identical, in part, because the malware detection analysis conducted by these MCD systems is in accordance with a common mechanism as described below (static and VM-execution environment). The input attributes are different based on the MCD system analyzing the network content. Examples of analysis and input attributes realized by different types of MCD systems are set forth below in Table A.

TABLE A

Examples of Attributes

| MCD System Type | Attributes (Input "I" and/or Analysis "A") |
|---|---|
| Network-based | I: Source IP (and/or MAC) address<br>I: Destination IP (and/or MAC) address<br>A: URL (website accessed)<br>A: Information identifying anomalous behaviors detected within the virtual execution environment (e.g., file changes, registry changes, process changes, etc.) |
| Communications-based | I: Sender identifier (email address, phone number for text, etc.)<br>I: Recipient identifier (email address, phone number for text, etc.)<br>I: Subject Line information<br>A: URL(s) present in communication message<br>A: Attachment present in communication message<br>A: Information identifying anomalous behaviors detected within the virtual execution environment (e.g., file changes, registry changes, process changes, etc.) |
| Storage-based | I: Network location of the file<br>I: Source IP (and/or MAC) address of downloading source<br>A: File Share name<br>A: File name/File size/File type<br>A: File checksum<br>A: Information identifying anomalous behaviors detected within the virtual execution environment (e.g., file changes, registry changes, process changes, etc.) |

Referring back to FIG. 2, triggered by aggregation logic 260 receiving analytic data from one or more MCD systems, correlation logic 270 attempts to find relationships between analysis attributes provided from different MCD systems. This may be accomplished by comparing similarities between artifacts being part of the analyzed network content (e.g., URLs, PDF attachments, etc.) as well as the anomalous behavior observed during analysis of the artifacts (e.g., registry changes, process changes, file changes, etc.). Time proximity may further be considered.

As an illustrative example, an anomalous behavior (e.g. particular registry change) for a first suspicious network content is detected by the first MCD system. The data associated with the anomalous behavior, namely the registry change in this example, undergoes a hash operation to produce a first hash value that is stored as a first analysis attribute.

Similarly, the second MCD system detects an anomalous behavior during malware analysis on a second suspicious network content, which is related to the first suspicious network content. The data associated with this anomalous behavior, such as the same registry change for example, undergoes a hash operation to produce a second hash value that is stored as a second analysis attribute. As the hash operation is conducted on the identical information, the second hash value would be equivalent to the first hash value.

Continuing this illustrative example, correlation logic 270 determines a match by comparing the first analysis attribute to analysis attributes supplied by the second MCD system, including the second analysis attribute. By determining that the first hash value matches the second hash value, the management system has effectively determined that the first network content is related to the second network content.

Optionally, as a secondary determination, correlation logic 270 may confirm that the first analysis attribute occurred within a prescribed time period (e.g., a few minutes, an hour, etc.) from detection of the second analysis attribute. The temporal proximity of the occurrence of these analysis attributes may provide additional information to confirm that the network contents associated with these attributes are related or the same.

Triggered by correlation logic 270, consolidation logic 280 consolidates input attributes associated with these matched analysis attributes. Continuing the above example, consolidation logic 280 provides consolidated input attributes to GUI logic 285. Based on these consolidated input attributes, GUI logic 285 provides one or more screen displays for conveying a more detailed summary of suspicious network content being detected by different MCD systems.

Although the illustrative embodiments are directed to conducting a hash or transformation operation on one or more analysis attributes prior to comparison with other analysis attributes uncovered elsewhere, it is contemplated that information associated with the analysis attributes (or a portion of such information) may be used in lieu of a hash (or transformation) value. For instance, it is possible to use some or all of information from the analysis attribute itself in a complex comparative algorithm to determine if a match is detected.

Figure 4:
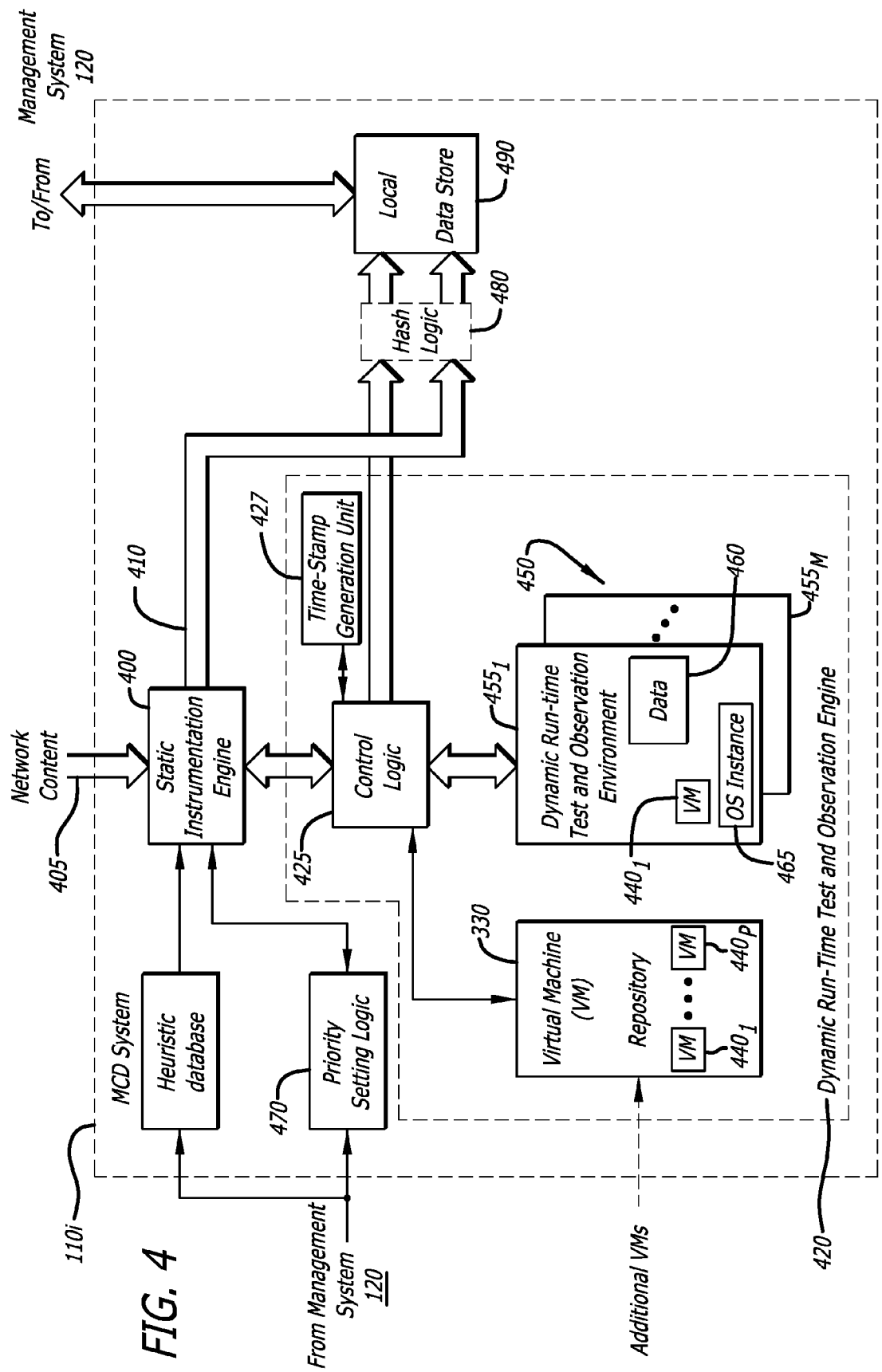
FIG. 4 is an exemplary diagram of logic within a MCD system.

Referring now to FIG. 4, an exemplary block diagram of logic within a MCD system (e.g., MCD system $110_1$ of FIG. 1) is shown. Herein, MCD system $110_1$ comprises (1) static instrumentation engine 400; (2) dynamic run-time test and observation (RTO) engine 420, (3) priority setting logic 470; (4) an optional hash (transformation) logic 480 and/or (5) local data store 490. As shown, static instrumentation engine 400 and dynamic RTO engine 420 are deployed within the same device. However, it is contemplated that static instrumentation engine 400 and dynamic RTO engine 420 may be employed within different devices and/or executed by different processors when implemented as software.

Static instrumentation engine 400 receives ingress network content 405 and generates a representation of the content 405 that is analyzed with one or more various software analysis techniques (e.g., control information analysis, or data analysis). Static instrumentation engine 400 then modifies content 405 to include within itself special monitoring functions and/or special stimuli functions operable during processing of content 405 in dynamic run-time test and observation engine 420. The monitoring functions report their results to control logic 425 and the stimuli functions are told what stimuli to generate by control logic

425. Also, a time-stamp value may be applied to content 405 through a time-stamp generation unit 427 and provided as an identifier for content 405. During the malware detection analysis by static instrumentation engine 400, upon detection of potential malware within the network content, an alert message is generated where at least a portion of information 410 associated with the alert message is routed to data store 490. Some of information 410, namely analysis attributes and/or identification information, may undergo hashing or some sort of transformation to minimize the amount of data to be stored in data store 490.

It is contemplated that static instrumentation engine 400 may be adapted to receive information from dynamic RTO engine 420 in order to instrument the code to better analyze specific behaviors.

After processing is completed by static instrumentation engine 400, content 405 is then provided to control logic 425 within dynamic RTO engine 420. Control logic 425 operates as a scheduler to dynamically control the malware detection analysis among different applications and/or the same application software among different run-time test and observation environments ("run-time environments").

In general, dynamic RTO engine 420 acts as an intelligent testing function. According to one approach, dynamic RTO engine 420 recursively collects information describing the current state of network content 405 and selects a subset of rules, perhaps corresponding at least in part to the behaviors set by the user, to be monitored during virtual execution of network content 405. The strategic selection and application of various rules over a number of recursions in view of each new observed operational state permits control logic 425 to resolve a specific conclusion about network content 405, namely if network content 405 constitutes suspicious network content.

As shown in FIG. 4, dynamic RTO engine 420 comprises a virtual machine repository 430 that is configured to store one or more virtual machines $440_1$-$440_P$ (where P≥1). More specifically, virtual machine repository 430 may be adapted to store a single virtual machine (VM) that can be configured by scheduling functionality within control unit 425 to simulate the performance of multiple types of electronic devices. Virtual machine repository 430 also can store any number of distinct VMs each configured to simulate performance of a different electronic device and/or different operating systems (or versions) for such electronic devices.

One or more run-time environments 450 simulate operations of network content 405 to detect one or more anomalous behaviors. For instance, run-time environment $455_1$ can be used to identify the presence of anomalous behavior during analysis of simulated operations of network content 405 performed on a virtual machine $440_1$. Of course, there can be multiple run-time test environments $455_1$-$455_M$ (M≥2) to simulate multiple types of processing environments for network content 405.

A virtual machine may be considered a representation of a specific electronic device that is provided to a selected run-time environment by control unit 425. In one example, control unit 425 retrieves virtual machine $440_1$ from virtual machine repository 430 and configures virtual machine $440_1$ to mimic a particular type of electronic device, such as a computer operating a certain version of Windows® OS. The configured virtual machine $440_1$ is then provided to one of the run-time environments $455_1$-$455_M$ (e.g., run-time environment $455_1$).

As run-time environment $455_1$ simulates the operations of network content 405, virtual machine $440_1$ can be closely monitored for any behaviors set by the user or for any prioritized content identified by priority setting logic 470. By simulating the processing of network content 405 and analyzing the response of virtual machine $440_1$, run-time environment $455_1$ can detect anomalous behaviors and upload analytic data associated with these behaviors to data store 490. This analytic data may include information identifying process changes, file changes and registry changes (or hash values associated with these changes).

Besides VM $440_1$, run-time environment $455_1$ is provided with network content 405 (or an instance 460 of network content) along with an instance 465 of the type of operating system on which target content 405 will run if deemed sufficiently safe during the dynamic anomalous behavior detection process. Here, the use of virtual machines (VMs) permits the instantiation of multiple additional run-time environments $455_1$-$455_M$ each handling specific network content and the OS instance, where the various run-time environments $455_1$-$455_M$ are isolated from one another.

As previously described, the simultaneous existence of multiple run-time environments $455_1$-$455_M$ permits different types of observations/tests to be run on particular network content. That is, different instances of the same network content may be provided in different run-time environments so that different types of tests/observances can be concurrently performed on the same content. Alternatively, different network content can be concurrently tested/observed.

For instance, a first packet-based data stream associated with network content may be tested/observed in a first run-time environment (e.g., environment $455_1$) while a second packet-based data stream is tested/observed in another run-time environment (e.g., environment $455_M$). Notably, instances of different operating system types and even different versions of the same type of operating system may be located in different run-time environments. For example, a Windows® 8 operating system (OS) instance 465 may be located in first run-time test environment $455_1$ while another instance of a different version of Windows® OS or Linux® OS (not shown) may be located in a second run-time test environment $455_M$. Concurrent testing of one or more packet-based data streams (whether different instances of the same packet-based data stream or respective instances of different packet-based data streams or some combination thereof) enhances the overall performance of the communication network.

III. Anomalous Behavior Analysis and Generation/Aggregation of Analytic Data

Figure 5A:
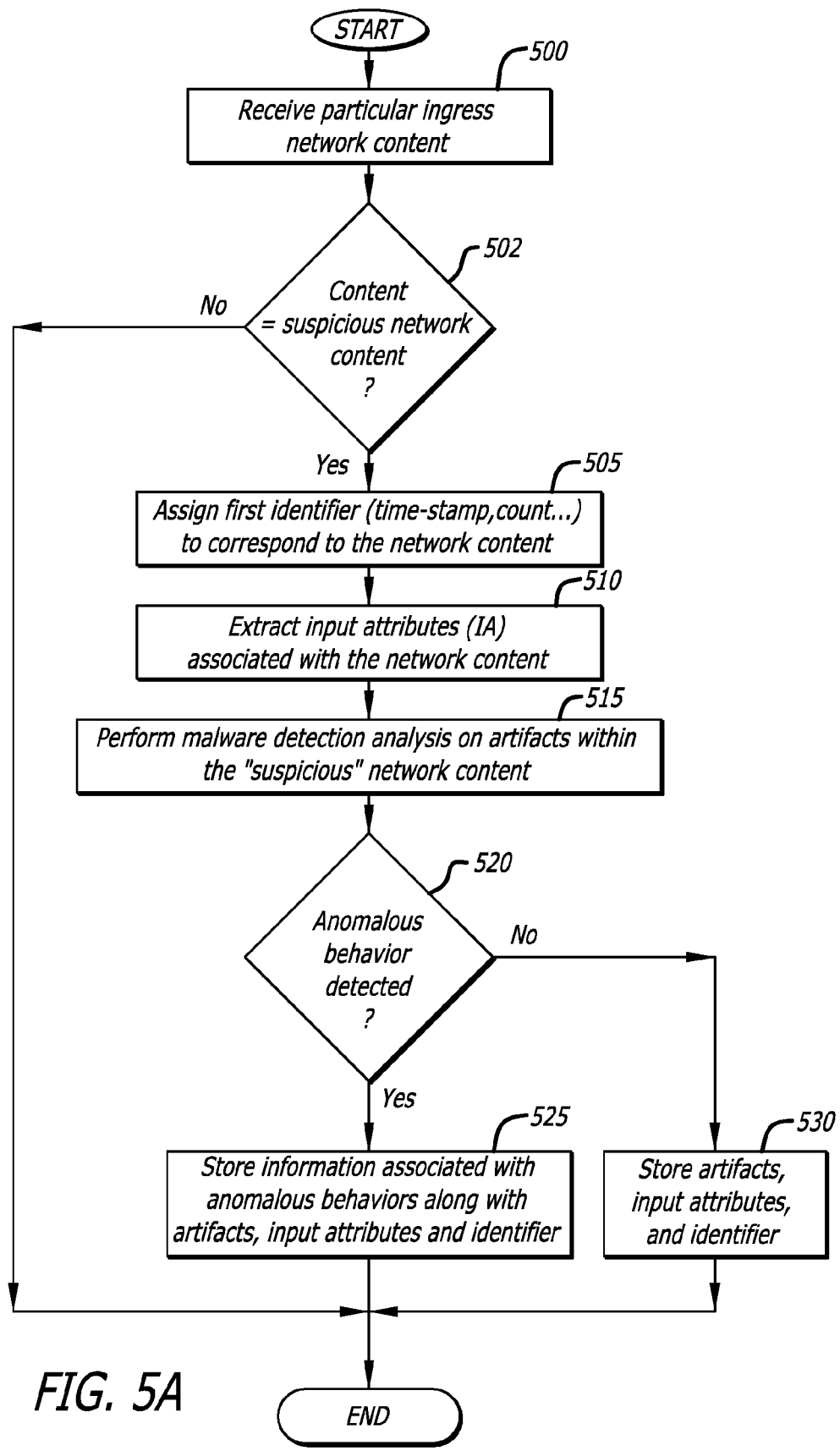
FIG. 5A is an exemplary embodiment of a flowchart partially illustrating an operation of populating a data store by a MCD system for subsequent access by the management system.

Referring to FIG. 5A, an exemplary diagram of a flowchart partially illustrating populating of a data store by a MCD system for subsequent access by the management system is shown. Prior to conducting the malware detection analysis, however, ingress network content is received by the MCD system. Upon determining that this content constitutes suspicious network content, a first identifier is assigned to the suspicious network content (blocks 500, 502 and 505). Input attributes associated with the ingress network content (e.g., source and/or destination) are extracted for subsequent storage in the data store of the MCD system (block 510). Also, malware detection analysis is conducted on the artifacts associated with the ingress network content (block 515).

Upon completion of the malware detection analysis, the MCD system stores the artifacts and information associated with any detected anomalous behavior as analysis attributes within a data store. With these analysis artifacts, the MCD system further stores an identifier associated with the content along with the input attributes (blocks 520 and 525). However, if anomalous behavior is not detected, the input attributes along with the identifier associated with the content and the artifacts are collectively stored in the data store (block 530).

Figure 5B:
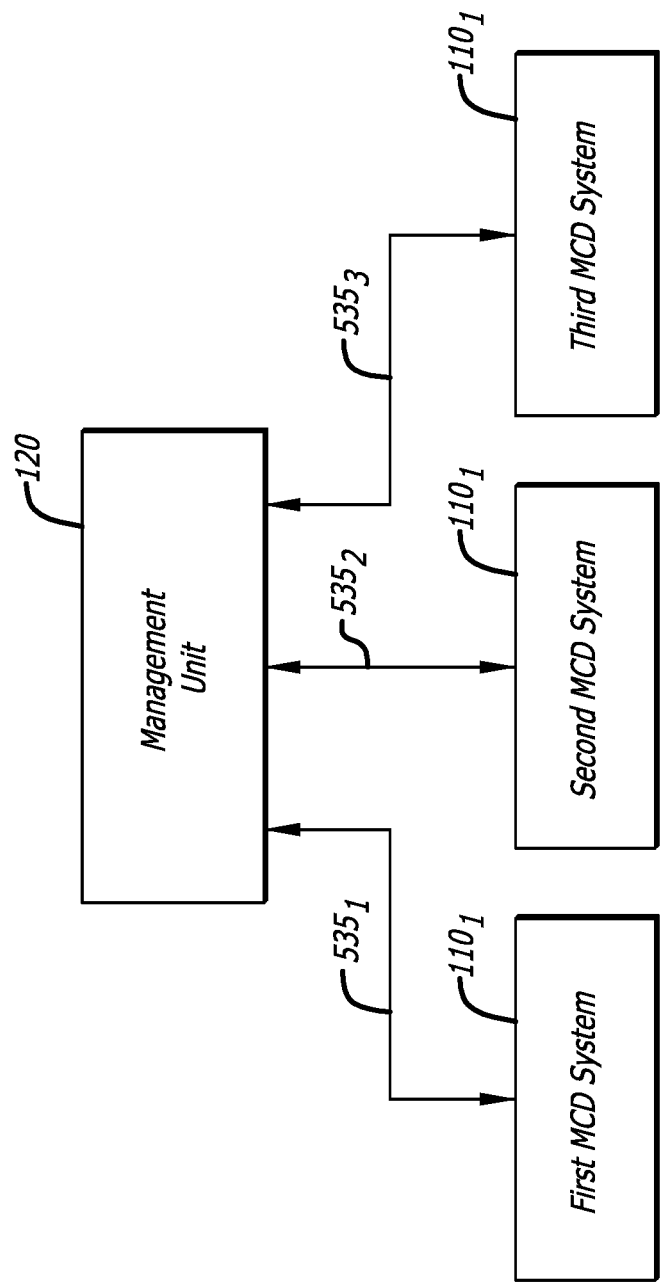
FIGS. 5B and 5C are exemplary general diagrams of the aggregation of analytic data by a MCD system for supply to the management system.
Figure 5C:
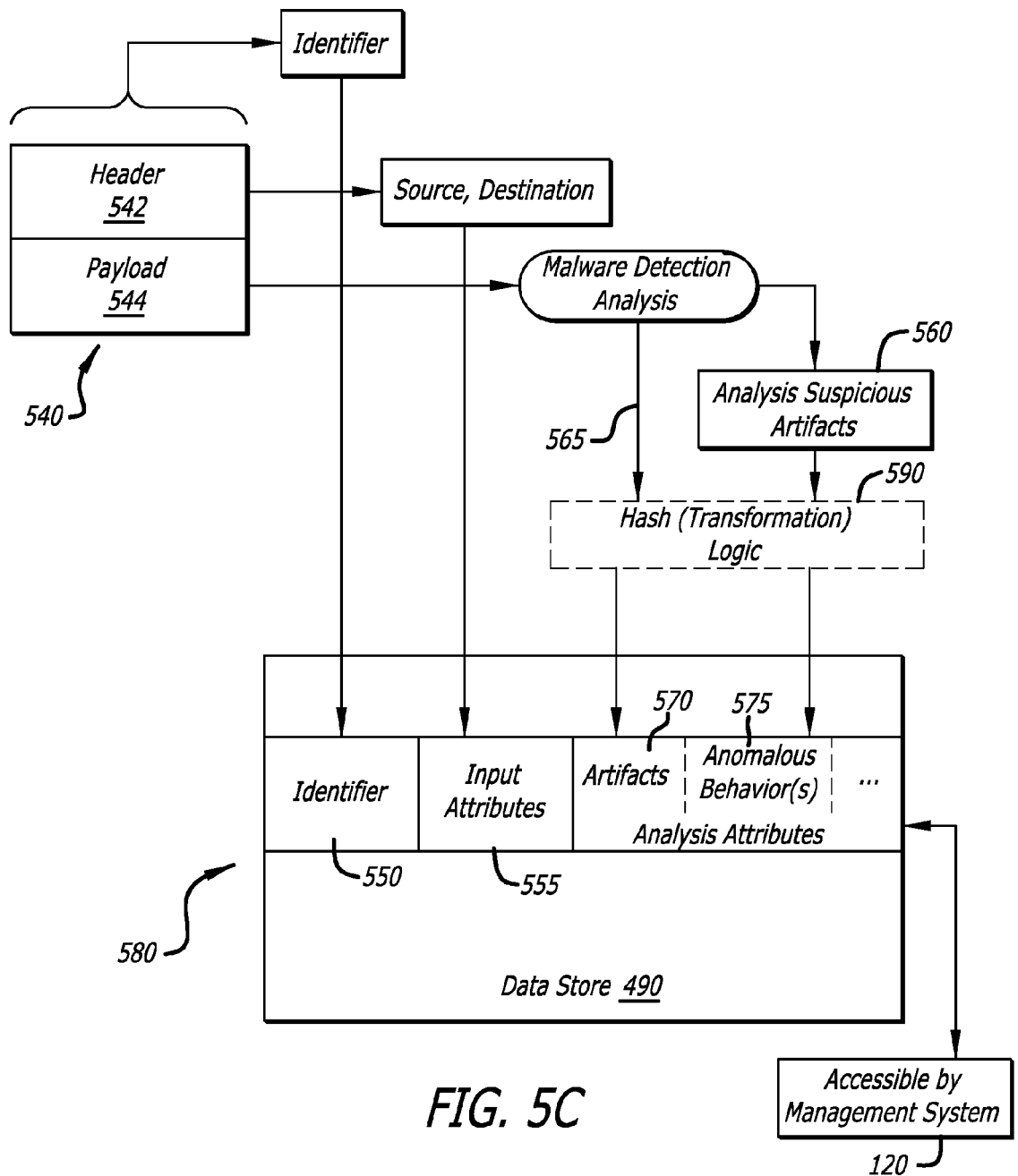

Referring now to FIGS. 5B and 5C, exemplary diagrams of the generation and aggregation of analytic data from a MCD system is illustrated. Herein, as shown in FIG. 5B, a plurality of MCD systems $110_1$-$110_N$ are communicatively coupled to management system 120 via transmission mediums $535_1$-$535_N$. MCD systems $110_1$-$110_3$ are adapted to intercept and analyze, in real-time, different types of network content (e.g., data traffic, email messages, uploaded files for storage, etc.) so as to determine whether the network content constitutes suspicious network content.

As shown in FIG. 5C, each MCD system $110_i$ (i=1, 2 or 3 in FIG. 1) is configured to receive a first type of network content 540, including header 542 and a payload 544. Upon receipt of network content 540, MCD system $110_i$ assigns an identifier 550 for network content 540 and extracts at least a portion of information within header 542 as the input attributes 555. Both identifier 550 and input attributes 555 are stored in an entry 580 in data store 490. Data store 490 may be situated as a local data store (as shown) or remotely located from MCD system $110_i$.

Upon performing malware detection analysis on payload 544, a determination is made whether any artifacts 560 (e.g. text, objects, etc.) within payload 544 are "suspicious," namely that data may constitute malware. If one or more artifacts 560 within payload 544 is "suspicious," MCD system $110_i$ analyzes artifact(s) 560 in a virtual machine (VM) execution logic (as described above) to detect any anomalous behavior(s) 565. Hence, artifacts 560 along with any detected anomalous behavior(s) 565 are stored as analysis attributes 570 and 575, respectively. However, if none of the artifacts within payload 544 is determined to be "suspicious," these artifact(s) 560 are merely stored as analysis attribute(s) 570.

Also, it is contemplated that MCD system $110_i$ may conduct a transformation on artifacts and/or recorded anomalous behaviors associated with network content 540 (e.g., one-way hash operation in accordance with a message-digest algorithm such as "MD5") to produce results having a lesser byte size than the artifact/behavior itself (e.g. hash value or digest). Of course, in lieu of a one-way hash operation, other transformations may be performed on payload artifacts 560 such as a checksum operation, for example. The hash values would be stored as analysis attributes 570 and 575 along with input attributes 555 and identifier 550.

Hence, content identifier 550 along with input attributes 555 and analysis attributes 570-575 are stored in data store 490, which is accessible by management system 120 on a periodic or aperiodic basis. More specifically, according to one embodiment of the disclosure, after a prescribed time has elapsed, management system 120 sends a query (e.g. Analytic Data Query message) for analytic data within local store 490 which has been recently stored since the last query. Upon receipt of the query, with perhaps successful authentication of management system 120 through a challenge/response scheme or another authentication scheme, analytic data from one or more entries within data store 490 are uploaded to management system 120.

IV. Correlation/Consolidation of Analytic Data

Figure 6A:
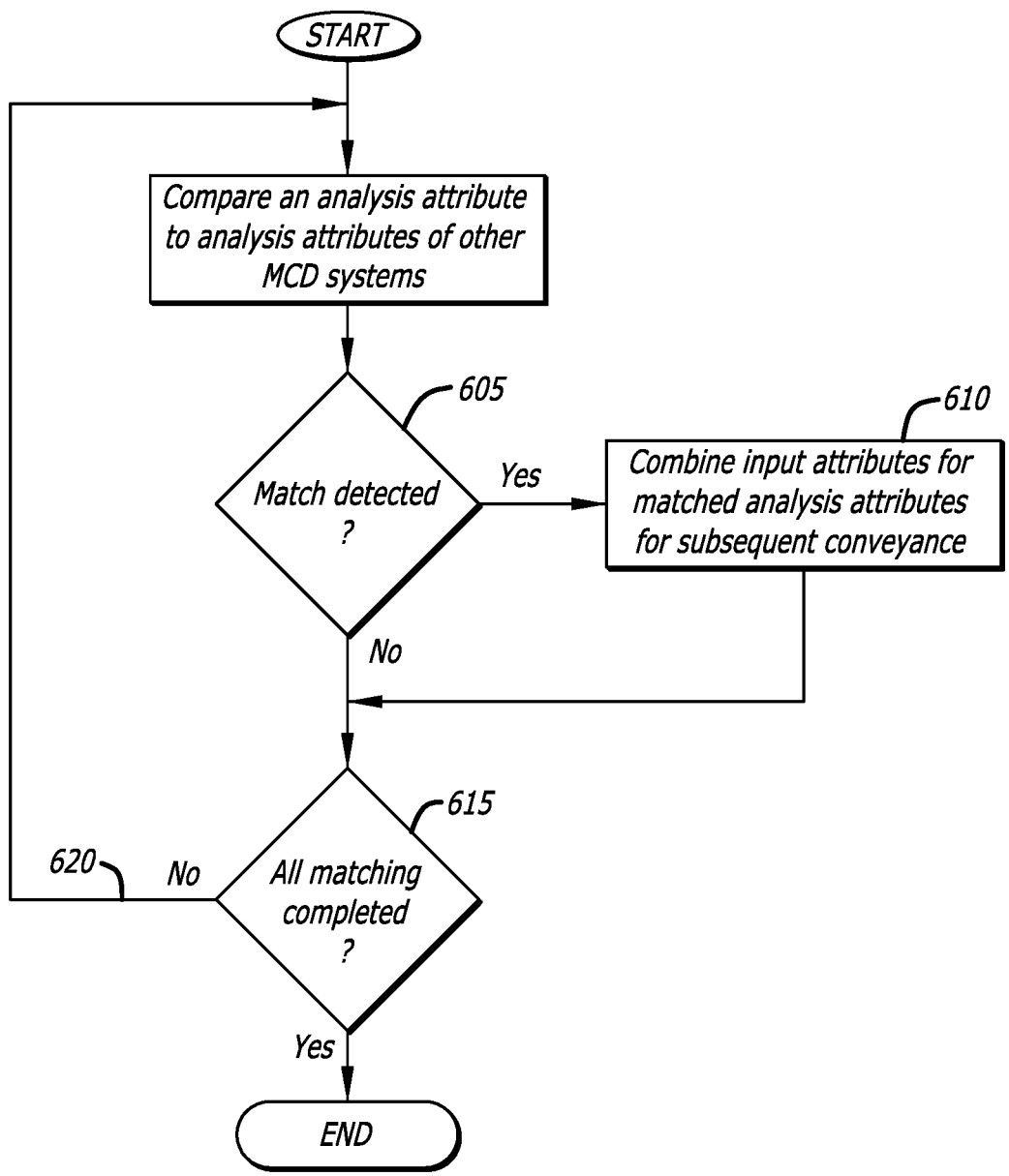
FIG. 6A is an exemplary embodiment of a flowchart of the general operations for correlating and consolidating analytic data from multiple MCD systems as conducted by the management system.

Referring to FIG. 6A, an exemplary embodiment of a flowchart of the operations for correlating and consolidating the analytic data from multiple MCD systems is shown. Herein, correlation logic within the management system compares analysis attributes associated with a first MCD system to analysis attributes associated with a second MCD system (block 600). If a match is detected for any of these attributes, the input attributes associated with the compared attributes are consolidated to collectively provide additional information concerning a malware attack associated with the network content (blocks 605 and 610). If a match is not detected, a determination is made whether all comparisons between the incoming analysis attributes have been conducted (block 615). If not, the correlation and consolidation operations continue (block 620). Otherwise, the correlation and consolidation process completes.

Figure 6B:
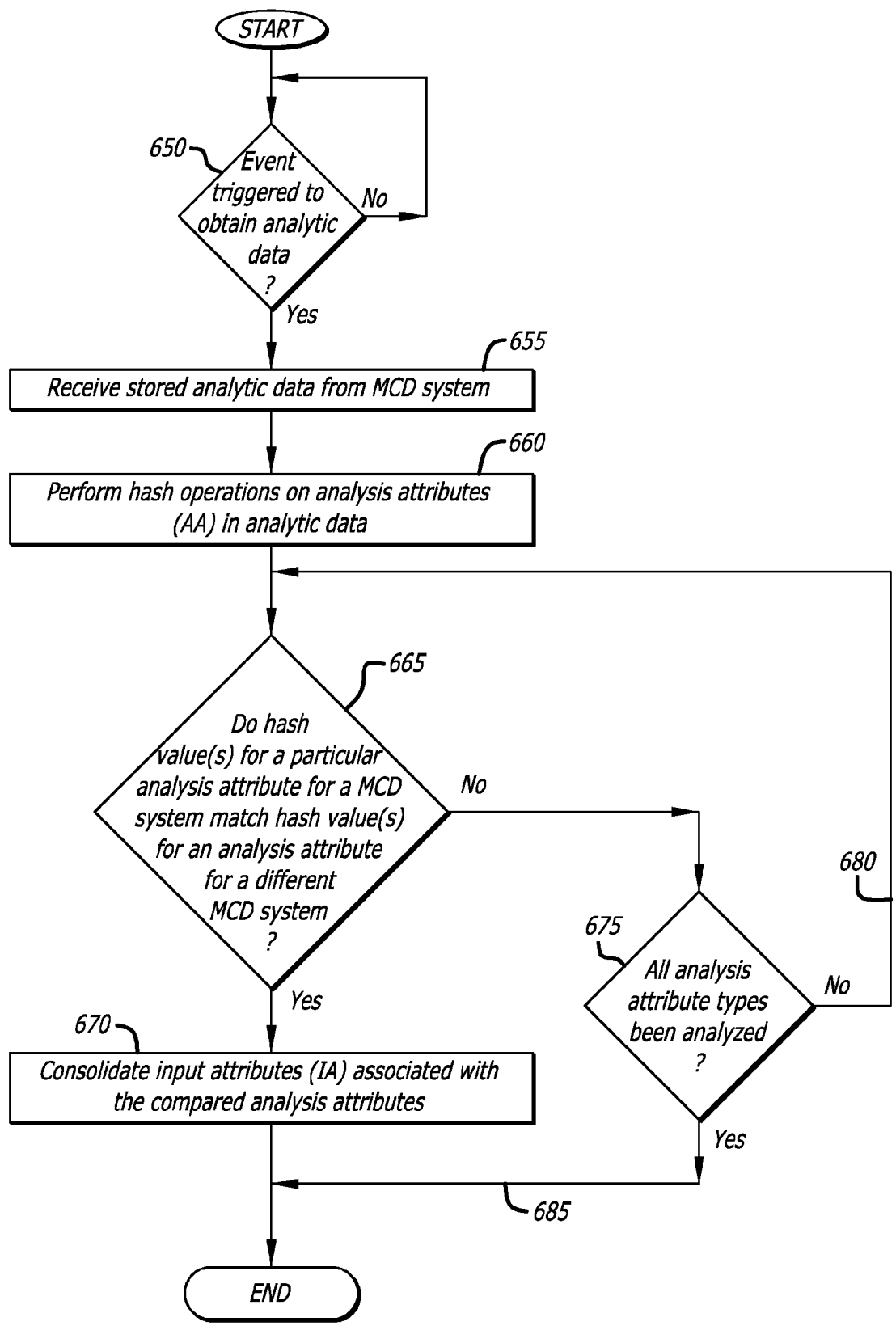
FIG. 6B is an exemplary embodiment of a more detailed flowchart partially illustrating correlation and consolidation of analytic data by the management system.
Figure 7A:
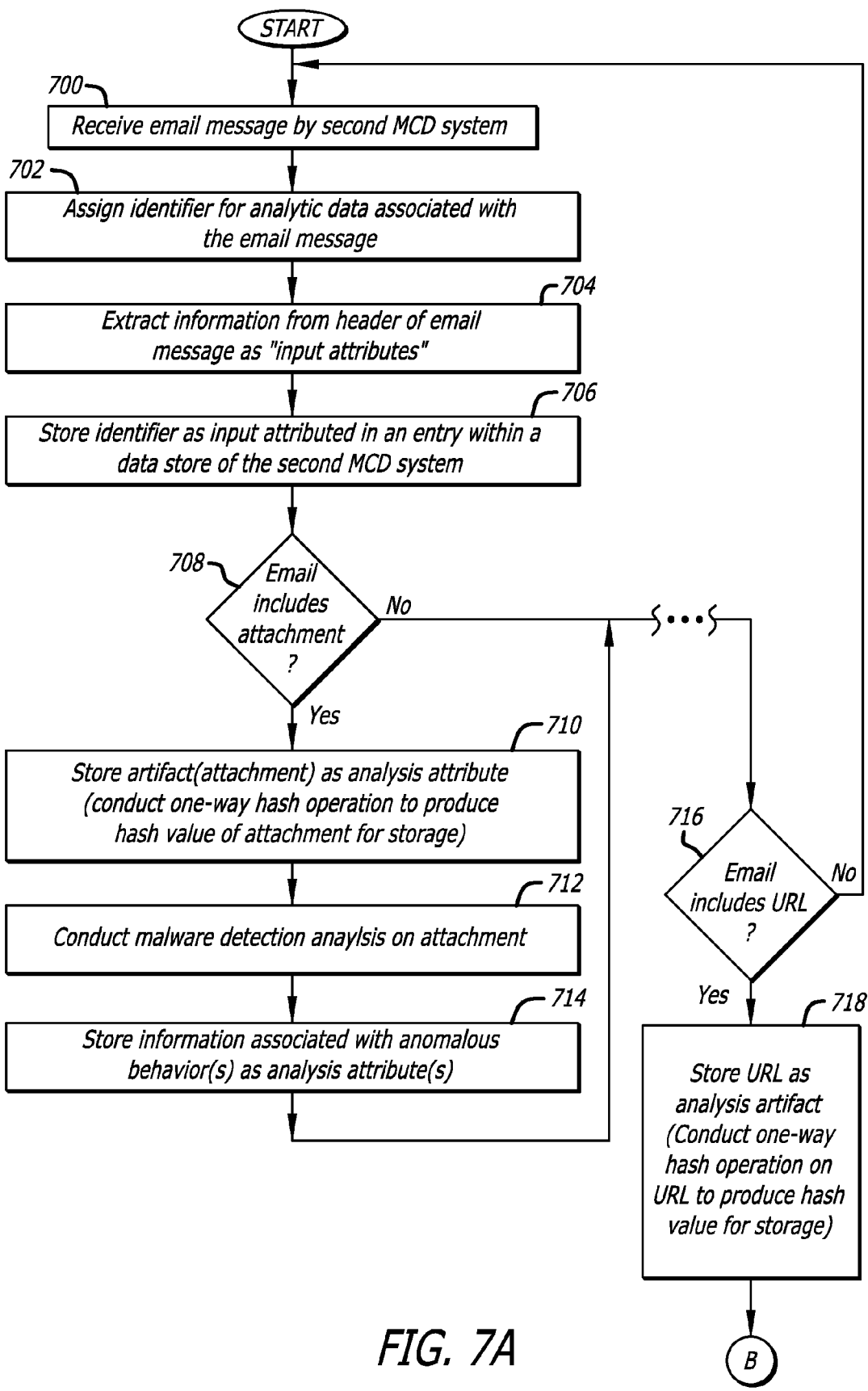
FIGS. 7A-7D are exemplary embodiments of a detailed illustrative example of aggregation, correlation and consolidation of analytic data by the management system.
Figure 7B:
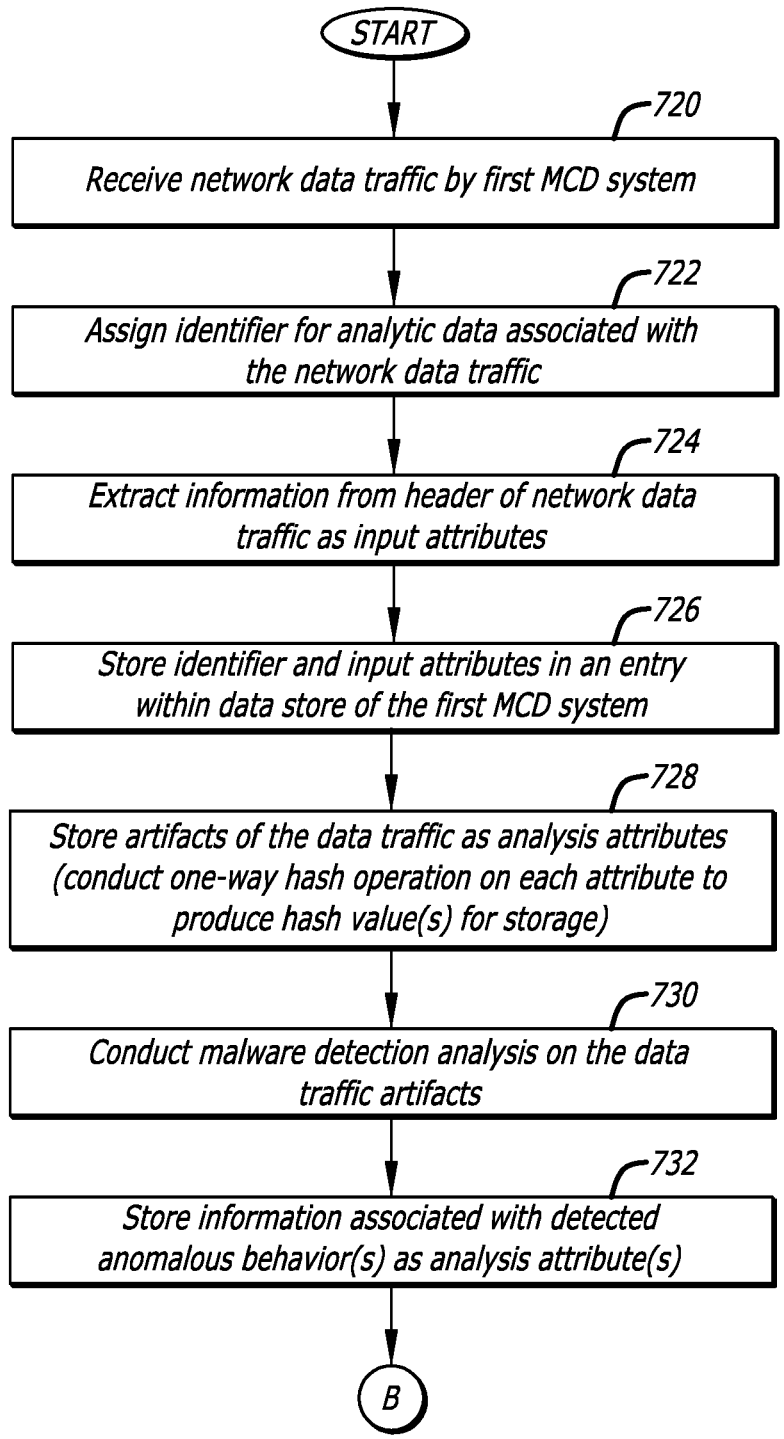
Figure 7C:
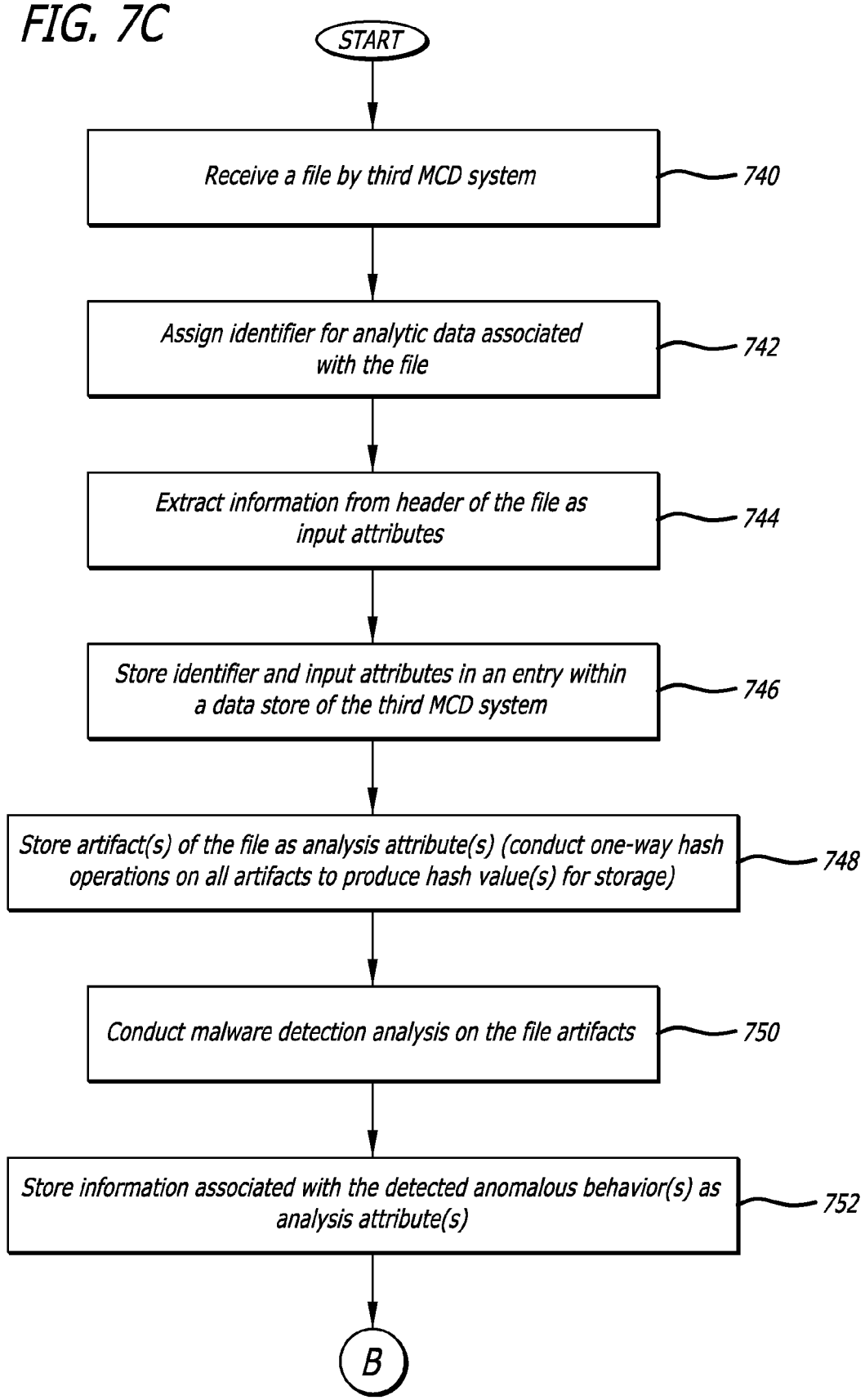
Figure 7D:
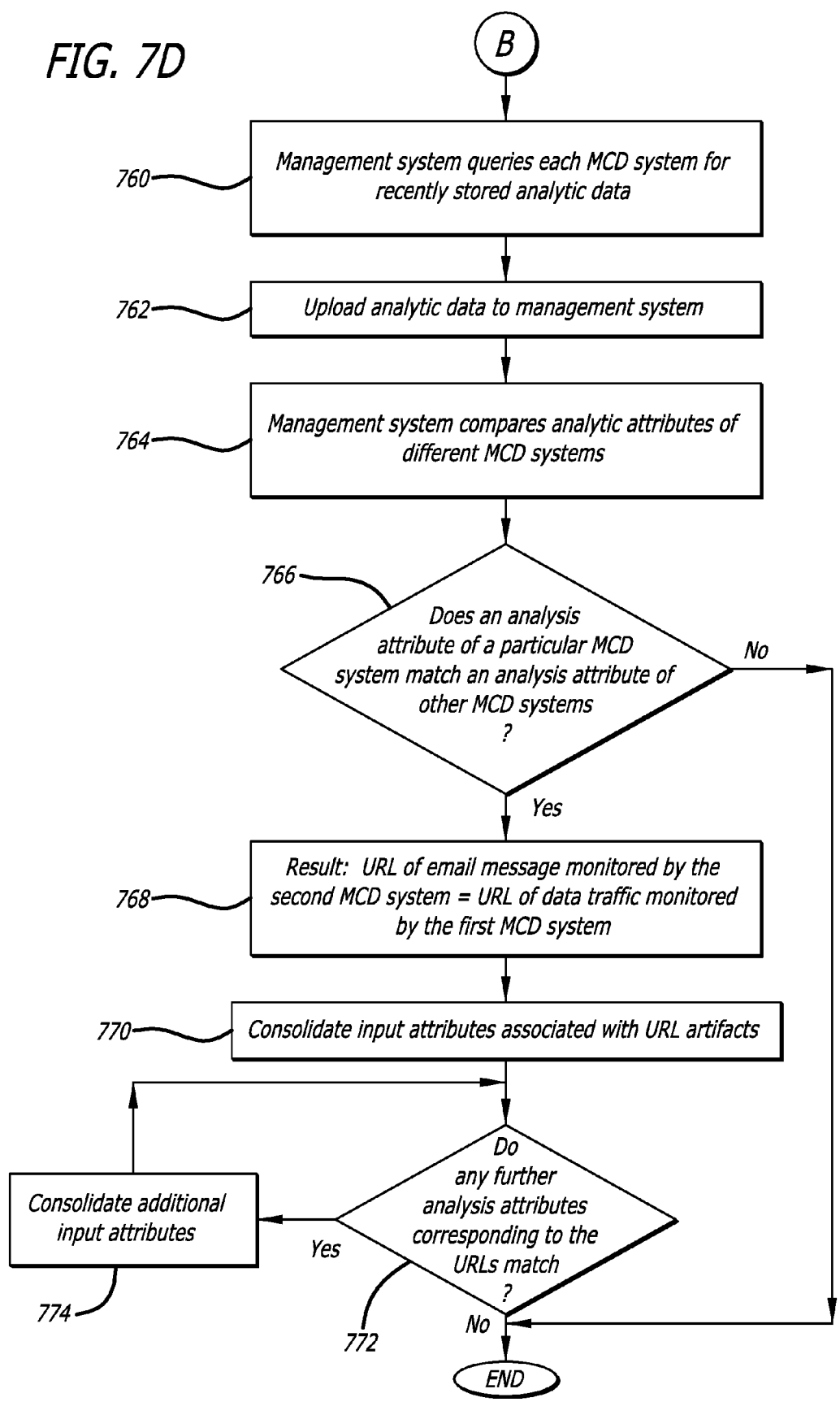

Referring now to FIG. 6B, an exemplary diagram of a flowchart partially illustrating correlation and consolidation of analytic data by the management system is shown. Herein, in response to a triggering event to commence acquisition of analytic data from a targeted MCD system (e.g., elapse of a prescribed time period, signaling of the presence of an alert message, etc.), the management system retrieves stored analytic data from the targeted MCD system (blocks 650 and 655). Thereafter, as an optional feature, the MCD system may perform a hash operation on each analysis attribute in the analytic data (block 660).

Thereafter, a recursive comparison scheme is conducted as to whether an analysis attribute associated with the targeted MCD system matches an analysis attribute associated with another MCD system (block 665). For example, the comparison may involve determining whether the hash value associated with an analysis attribute uploaded by the targeted MCD system matches a hash value associated with an analysis attribute uploaded by another MCD system.

If a match is detected, the management system consolidates the input attributes associated with the compared analysis attributes (block 670). Otherwise, a determination is made whether all of the newly received analysis attributes have been analyzed (block 675). If not, the correlation and consolidation analysis is recursive and returns to the operations set forth in operation 680. Otherwise, the analysis is completed (operation 685).

V. Illustration of Aggregation/Correlation/Consolidation of Analytic Data

Referring to FIG. 7, a detailed illustrative example of aggregation, correlation and consolidation of analytic data to provide a more detailed elaboration of a malware attack is shown. Operating as a communication-based security appliance, a second MCD system is configured to receive a first type of network content such as an email message including a header and a payload (block 700). Upon receipt of email message, the second MCD system assigns a content identifier to the email message and extracts at least a portion of information within header as the input attributes (blocks 702 and 704). Both the content identifier and the input attributes are stored within an entry associated with a data store associated with the second MCD system (block 706).

Thereafter, a determination is made as to whether the payload of the email message includes a first artifact such as an attachment (block 708). If so, the second MCD system conducts a malware detection analysis on the first artifact (attachment) by conducting static and dynamic malware analysis as described in FIG. 4 to detect any anomalous behaviors (block 712). Prior to performing the malware detection analysis, however, the second MCD system may conduct a one-way hash operation on the attachment to produce a hash value for storage as the analysis attribute or store the artifact as an analysis attribute (block 710).

Thereafter, any anomalous behaviors uncovered during the virtual processing of the artifact (e.g., detachment and opening of the attachment) within the VM-based run-time environment. The anomalous behaviors, if any, are stored as analysis attributes within the corresponding entry (block 714).

Besides determining whether the payload of the email message includes a first type of artifact, another determination is made as to whether the payload includes a second type of artifact such as a URL (block 716). If so, the URL is not analyzed in the VM-base run-time environment. Rather, the URL (or a hash value of the URL) is added as an analysis attributes within the entry (block 718).

Operating as a web-based security appliance contemporaneously with the second MCD system, a first MCD system is configured to receive a second type of network content such as a network data traffic including a header and a payload (block 720). Upon receipt of data traffic, the first MCD system assigns a content identifier and extracts at least a portion of information within header as the input attributes (blocks 722 and 724). Both the content identifier and the input attributes are stored within an entry within a data store associated with the first MCD system (block 726).

Thereafter, a malware detection analysis is performed on the data traffic by at least analyzing artifacts of the payload by conducting static and dynamic malware analysis as described in FIG. 4 to detect any anomalous behaviors (block 730). These artifacts may include a single frame or series of video frames, audio, text, images, etc. The first MCD system also stores the one or more artifacts as analysis attributes, where such artifacts may be stored as hash values (block 728).

Thereafter, any anomalous behaviors uncovered during analysis of the artifact(s) in a VM-based run-time environment are also stored as analysis attributes within the corresponding entry (block 732).

Lastly, operating as a storage-based security appliance, the third MCD system is configured to receive a third type of network content, such as a file being part of the data payload (block 740). Upon receipt of the file, the first MCD system assigns a content identifier and extracts at least a portion of information within header as the input attributes (blocks 742 and 744). This information may include a network location for storage of the file. Both the content identifier and the input attributes are stored as an entry within a local store associated with the third MCD system (block 746).

Thereafter, a malware detection analysis is performed on the file by at least analyzing artifacts in the file by conducting static and dynamic malware analysis as described in FIG. 4 to detect any anomalous behaviors (block 750). The third MCD system also stores the one or more artifacts as analysis attributes, where such artifacts may be transformed as hash values (block 748).

Any anomalous behaviors uncovered during analysis of the file artifact(s) in a VM-based run-time environment are also stored as analysis attributes within the corresponding entry (block 752).

Periodically, the management system queries each of the MCD systems for recently stored analytic data (block 760). The entries within the data store for a corresponding MCD system that include analytic data (e.g. at least input and analysis attributes) recently stored since the last query are uploaded to the management system (block 762). According to one embodiment, the analytic data from each MCD system remains segregated within the local store of the management system.

The management system compares the analysis attributes associated with the first MCD system, the second MCD system and the third MCD system to determine if any of these analysis attributes match to denote that the network content was detected by multiple MCD systems (blocks 764 and 766).

Presuming for this illustrative example that the URL within the email message was selected, which caused a file (FILE-1) to be downloaded from a malicious server and FILE-1 was subsequently stored on the file share. For this example, the management system correlates the analytic data and determines that the URL associated with the email message matches the URL associated with the network data traffic (block 768). Hence, the input attributes associated with these analysis attributes are consolidated so that the management system may now convey that the URL associated with FILE-1 was received via an email message at time t1 from sender (SENDER-1) to multiple recipients, including RECEPIENT-1 who selected the URL (and received FILE-1 at time t2) as a download while RECIPIENTS-2 . . . 5 who have not yet activated the URL (block 770).

Furthermore, upon further correlation of analysis attributes associated with the URLs, a determination is made that FILE-1 detected by the first MCD system as being downloaded upon selecting the URL also was detected by the third MCD system as being uploaded into a file share (block 772). Hence, the input attributes associated with these analysis attributes are consolidated so that the management system may convey that the URL associated with FILE-1 was received via an email message at time t1 from SENDER-1 to RECEPIENTS-1 . . . 5, where RECIPIENT-1 activated the URL while RECIPIENTS-2 . . . 5 have not yet activated the URL, and FILE_1 was downloaded to RECIPIENT-1 at time t2 and uploaded by RECIPIENT-1 to the file share at network location 0011xx at time t3 (block 774). Such an analysis continues until no further matches are determined for the associated analysis attributes for this particular network content thread.

This information enables the network administrator to further monitor whether the migration of FILE-1 (e.g., was it downloaded by any electronic devices from file share, etc.) and enables the network administrator to not only remove the malicious file from the file share, but also send advisories to USERS 2-5 of the presence of malware and to avoid activating the URL on the particular email message.

Figure 8:
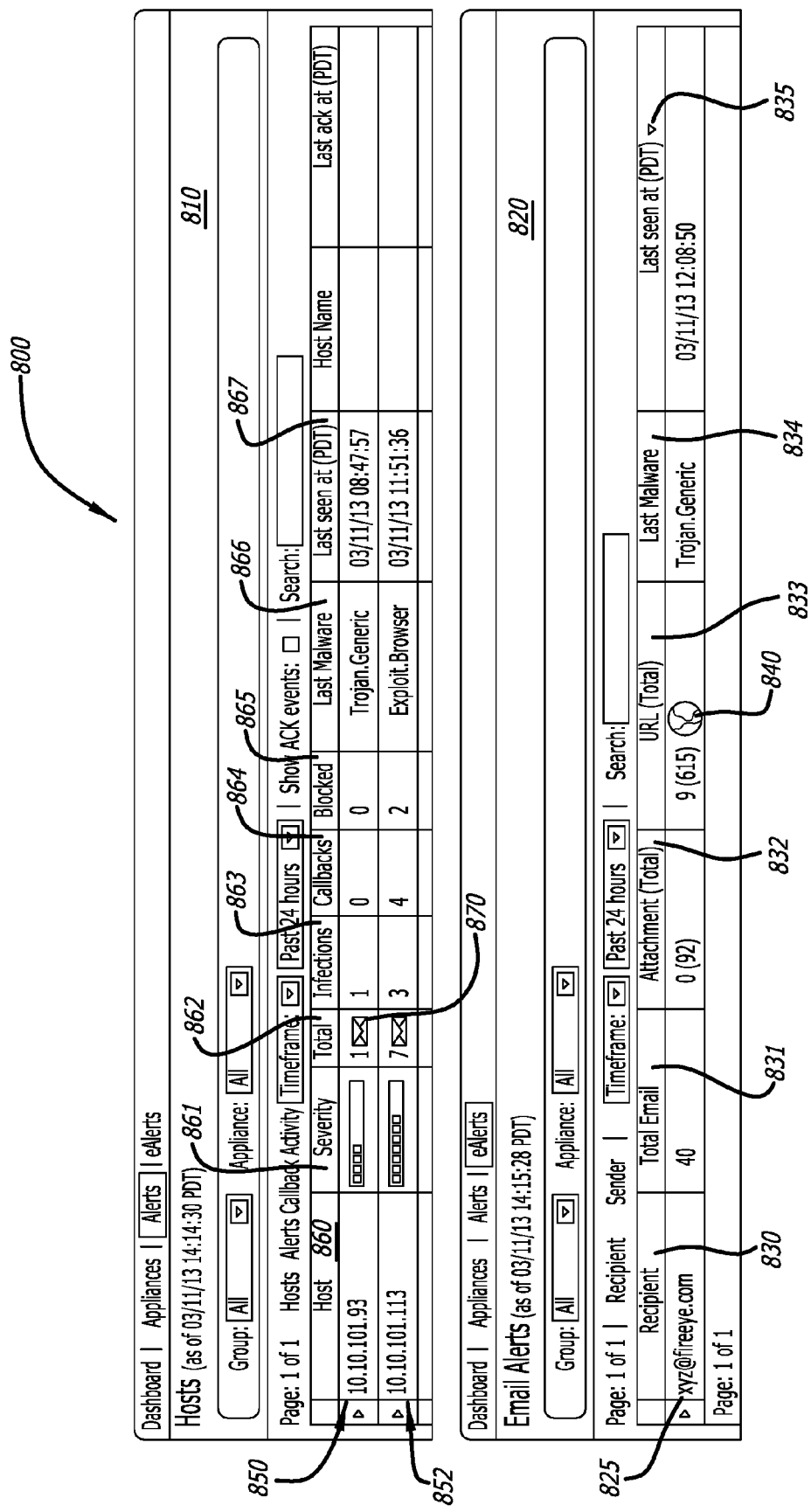
FIG. 8 is an exemplary embodiment of a display screen that includes data produced by the correlation logic and consolidation logic to provide a consumer with a holistic view of a malware attack.

Referring now to FIG. 8, an exemplary embodiment of a display screen 800 that includes data produced by the correlation logic and consolidation logic to provide a consumer with a holistic view of a malware attack is shown. In particular, display screen 800 illustrates a first display portion 810 that identifies alerts from first MCD system 110$_1$ of FIG. 1 and a second display portion 820 that identifies alerts from second MCD system 110$_2$ of FIG. 1.

As shown, second display portion 820 provides one or more entries that identify recipients of analyzed email messages. For instance, as shown, a first entry 825 comprises a first field 830 identifying a recipient (XYZ@fireeye.com) to which email messages have been sent. The recipient may correspond to any type of system such as an employee's computer, a server accessible to multiple employees, etc. First entry 825 of second display portion 820 further comprises a second field 831 identifying the total number of email messages (e.g. forty email messages) received by the recipient; a third field 832 identifying a number of attachments in the email messages (e.g., 92 attachments) as well as the number of attachments that are deemed either "malicious" or at least "suspicious" (e.g. no attachments); a fourth field 833 identifying a number of URLS detected in the email messages (e.g. 615 URLs) and the number of suspicious (or malicious) URLs (e.g., 9 suspicious URLs); a fifth field 834 identifying the last malware detected for the suspicious (or malicious) URLs; and a sixth field 835 identifying a time of last detection of the email messages.

An image 840, which is represented by a globe for this illustrative example, is produced by the correlation logic and/or the consolidation logic and displayed within display screen in one of the fields of second display portion 820 (e.g., fourth field 833). Image 840 identifies that at least some of these URLs have been selected by users of downstream electronic devices based on the correlation and consolidation of input attributes for matching analysis attributes detected by both first and second MCD systems 110$_2$ and 110$_2$ of FIG. 1.

First display portion 810 provides one or more entries that identify electronic devices that have received ingress traffic with suspicious network content. For instance, as shown, a first entry 850 comprises a first field 860 identifying an IP address of a first electronic device (10.10.101.93) from which suspicious (or malicious) network content has been detected. First entry 850 in first display portion 810 further comprises a second field 861 identifying a severity rating of suspicious (or malicious) activity detected for the first electronic device. The severity rating may be based, at least in part, on a total number of suspicious (or malicious) activities detected and the type of activities (e.g. infections of malware, callbacks, blocks, etc.) set forth in fields 862-865.

As further shown in FIG. 8, field 866 identifies the last malware detected for the suspicious (or malicious) network content (e.g., malicious code such as Trojan Generic, Exploit.Browser, etc.). Additional malware detected for network content may be displayed by selecting an element within field 866. A final field 867 identifies a time of last detection of the network content.

An image 870, which is represented by an envelope for this illustrative example, is produced by the correlation logic and/or the consolidation logic and displayed within display screen in one of the fields (e.g., field 862) of first display portion 810. Image 870 identifies that the suspicious network content resulted from an email message received by the host electronic devices, where such generation is based on the correlation and consolidation of input attributes for matching analysis attributes detected by both first and second MCD systems 110$_2$ and 110$_2$ of FIG. 1.

The same general layout is provided for second entry 852 and other entries within first display portion 810. It is contemplated that the layout may be provided through other viewpoints besides alerts and e-alerts, such as by specific MCD systems where the granularity of the correlation and consolidation information may represent which MCD system detected which suspicious activity.

In the foregoing description, the invention is described with reference to specific exemplary embodiments thereof. It will, however, be evident that various modifications and changes may be made thereto without departing from the broader spirit and scope of the invention as set forth in the appended claims. For instance, in lieu of or in addition to the MCD system 110$_1$-110$_3$ of FIG. 1, a malware analysis system (MAS) system may be communicatively coupled to management system 120 of FIG. 1. The MAS system operates as a forensic workbench by receiving, based on user interaction, suspicious network content from at least one of MCD systems 110$_1$-110$_3$. The MAS system can be adapted with capabilities for a user to conduct a more in-depth analysis of suspicious network content, where such analysis may be uploaded to management system 120 as well.

What is claimed is:

1. An electronic device for detecting a malware attack and controlling a display of information associated with a migration of suspicious network content during the malware attack, the electronic device comprising:
   a processor;
   a communication interface logic communicatively coupled to the processor; and
   a storage device communicatively coupled to the processor, the storage device comprises
     aggregation logic that, when processed by the processor, receives analytic data from each of a plurality of systems via the communication interface logic, the analytic data from each system of the plurality of systems comprises one or more input attributes being information used in routing of the suspicious network content over a network and one or more analysis attributes being (a) a portion of the suspicious network content or (b) at least one anomalous behavior observed during prior analysis of the portion of the suspicious network content,
     correlation logic that, when processed by the processor and responsive to receiving the analytic data from each of the plurality of systems, attempts to find relationships between the one or more analysis attributes provided from each system of the plurality of systems based on determined similarities between the one or more analysis attributes,
     consolidation logic that, when processed by the processor, consolidates input attributes of the one or more input attributes associated with at least (i) a first analysis attribute of the one or more analysis attributes from a first system of the plurality of systems and (ii) a second analysis attribute of the one or more analysis attributes from a second system of the plurality of systems in response to detected similarities between the first analysis attribute and the second analysis attribute, and
     display logic that, when processed by the processor, generates display information including the consolidated input attributes.

2. The electronic device of claim 1, wherein the correlation logic attempts to find relationships between the one or more analysis attributes by at least determining whether the first analysis attribute matches the second analysis attribute.

3. The electronic device of claim 2, wherein the consolidation logic attempts to find relationships between the one or more analysis attributes provided from each system of the plurality of systems by at least identifying that a first network content including the first analysis attribute received from the first system is the same as or related to a second network content including the second analysis attribute received from the second system.

4. The electronic device of claim 1, wherein the first analysis attribute comprises at least one of (i) information directed to a portion of the network content that is analyzed for malware within the first system and (ii) one or more anomalous behaviors observed during malware detection analysis of the information.

5. The electronic device of claim 3, wherein the first network content includes an electronic mail (email) message that is analyzed for malware by the first system and the second network content includes network traffic that is analyzed for malware by the second system.

6. The electronic device of claim 1, wherein the one or more input attributes associated with the first analysis attribute comprises at least one of (i) information identifying a destination of the first network content and (ii) information identifying a source of the first network content.

7. The electronic device of claim 1, wherein the correlation logic attempts to find the relationships between the one or more analysis attributes by at least comparing similarities between an artifact being part of the one or more analysis attributes and anomalous behavior observed during analysis of the artifacts, the artifact including a Uniform Resource Locator (URL) or a document while the observed anomalous behavior includes a registry change or a file change.

8. The electronic device of claim 3, wherein the display logic, when executed by the processor, generates the display information that includes one or more images representing that the first analysis attribute detected by the first system originated from the second network content analyzed by the second system.

9. The electronic device of claim 1, wherein the first system comprises a web-based security appliance to inspect ingress data traffic and to provide at least the first attribute to based on an analysis of the ingress data traffic.

10. The electronic device of claim 9, wherein the second system comprises a communication-based security appliance to analyze an incoming communication message and to provide at least the second attribute to the electronic device, the incoming communication message includes an electronic mail message or a text message.

11. The electronic device of claim 9, wherein the second system comprises a storage-based security appliance to analyze a file and to provide at least the second attribute associated with the file to the electronic device.

12. In communication with a plurality of security appliances, an electronic device for providing a holistic view of a malware attack, the electronic device comprising:
 a processor;
 a storage device communicatively coupled to the processor, the storage device comprises
  aggregation logic that, when processed by the processor, receives one or more input attributes being information used in routing of suspicious network content over a network and one or more analysis attributes from each of the plurality of security appliances, wherein the one or more analysis attributes being (a) a portion of the suspicious network content or (b) at least one anomalous behavior observed during analysis of the portion of the suspicious network content in the plurality of security appliances,
  correlation logic that, when processed by the processor, attempts to find relationships between the one or more analysis attributes provided from each security appliance of the plurality of security appliances,
  consolidation logic that, when processed by the processor, receives at least (i) a first analysis attribute from a first security appliance of the plurality of security appliances and (ii) a second analysis attribute of the one or more analysis attributes from a second security appliance of the plurality of security appliances in response to the first analysis attribute corresponding to the second analysis attribute, and consolidates input attributes of the one or more input attributes associated with the first analysis attribute and the second analysis attribute, and
  display logic that, when processed by the processor, generates display information including the consolidated input attributes.

13. The electronic device of claim 12, wherein the correlation logic attempts to find relationships between the one or more analysis attributes by at least determining whether the first analysis attribute matches the second analysis attribute.

14. The electronic device of claim 13, wherein the consolidation logic attempts to find relationships between the one or more analysis attributes provided from each security appliance of the plurality of security appliances by at least identifying that a first network content including the first analysis attribute received from the first security appliance is the same as or related to a second network content including the second analysis attribute received from the second security appliance.

15. The electronic device of claim 14, wherein the first security appliance includes a first malware content detection system and the second security appliance includes a second malware content detection system.

16. The electronic device of claim 12, wherein the first security appliance comprises a web-based security appliance to inspect ingress data traffic and to provide at least the first attribute to the electronic device based on a result of an inspection of the ingress data traffic by the web-based security appliance.

17. The electronic device of claim 12, wherein the second security appliance comprises a communication-based security appliance to analyze an incoming communication message and to provide at least the second attribute to the electronic device, the incoming communication message includes an electronic mail message or a text message.

18. The electronic device of claim 12, wherein the second security appliance comprises a storage-based security appliance to analyze a file to be stored in a file server and to provide at least the second attribute associated with the file to the electronic device.

* * * * *